(12) United States Patent
Foster et al.

(10) Patent No.: US 7,996,191 B2
(45) Date of Patent: Aug. 9, 2011

(54) PROPERTY DEVELOPMENT UTILIZING STRUCTURE DEPICTED IN A MOTION PICTURE OR TELEVISION SHOW

(76) Inventors: Jon Milton Foster, Kissimmee, FL (US); Robert Paul Rowe, Toluca Lake, CA (US)

( * ) Notice: Subject to any disclaimer, the term of this patent is extended or adjusted under 35 U.S.C. 154(b) by 597 days.

(21) Appl. No.: 12/036,342

(22) Filed: Feb. 25, 2008

(65) Prior Publication Data

US 2008/0143884 A1 Jun. 19, 2008

Related U.S. Application Data

(63) Continuation-in-part of application No. 10/486,603, filed as application No. PCT/US02/025520 on Aug. 9, 2002, now Pat. No. 7,337,094.

(60) Provisional application No. 60/311,608, filed on Aug. 10, 2001.

(51) Int. Cl.
  *G06F 17/50* (2006.01)
(52) U.S. Cl. ............................................. 703/1
(58) Field of Classification Search ...... 703/1; 345/420; 434/72; 348/700; 715/723; 119/253
  See application file for complete search history.

(56) References Cited

U.S. PATENT DOCUMENTS

| | | | |
|---|---|---|---|
| 3,646,690 A | 3/1972 | Feagan | |
| 4,527,981 A * | 7/1985 | Chisum | 434/72 |
| 5,603,189 A | 2/1997 | Levy | |
| 5,668,736 A * | 9/1997 | Douglas et al. | 703/1 |
| 6,037,945 A * | 3/2000 | Loveland | 345/420 |
| 6,115,974 A | 9/2000 | Milanian | |
| 6,983,420 B1 * | 1/2006 | Itou et al. | 715/723 |
| 7,092,040 B1 * | 8/2006 | Watanabe | 348/700 |
| 7,337,094 B2 * | 2/2008 | Foster et al. | 703/1 |
| 2002/0046071 A1 | 4/2002 | Walker et al. | |
| 2002/0062243 A1 | 5/2002 | Anderson | |
| 2006/0164560 A1 * | 7/2006 | Watanabe | 348/700 |
| 2006/0231041 A1 * | 10/2006 | Bilow | 119/253 |

OTHER PUBLICATIONS

Coussement, L., "The Other in Star Trek: A Comparison of the Original series with the Next Generation", 2007.*
Birdtistle, W., "A contested Ascendancy: Problems with personal managers acting as producers", 2000.*
Bennett, Mark. TV Sets: Fantasy Blueprints of Classic TV Homes. NY, TV Books, 1996. Forward; Preface; Cleaver's House, p. 5-8; Stevens' House, p. 79-82.
Fukuda, Tomohiro, et al. Networked VR System: Kitchen Layout Design for Customers. NY: ACM Press, 1997. pp. 93-100.

* cited by examiner

*Primary Examiner* — Kandasamy Thangavelu
(74) *Attorney, Agent, or Firm* — David G. Maire; Beusse Wolter Sanks Mora & Maire, P.A.

(57) ABSTRACT

A method of design for creating a habitable structure containing architectural elements that collectively cause the habitable structure to resemble a fanciful structure portrayed in a motion picture or television show. The fantasy of the motion picture or television show is made more real by determining the dimensions of the architectural elements of a movie studio backlot facade and an interior stage set that were used during the filming of the motion picture or television show. Mismatches between architectural elements are resolved by establishing priorities to select between the conflicting architectural elements, or by using an architectural facade to incorporate both of the conflicting elements.

20 Claims, 6 Drawing Sheets

PROPERTY DEVELOPMENT UTILIZING STRUCTURE DEPICTED IN A MOTION PICTURE OR TELEVISION SHOW

This application is a continuation-in-part of U.S. patent application Ser. No. 10/486,603 filed on 9 Feb. 2004 (now U.S. Pat. No. 7,337,094 issued on 26 Feb. 2008), which in turn claimed benefit of the 9 Aug. 2002 filing date of International Application No. PCT/US02/025520, which in turn claimed benefit of the 10 Aug. 2001 filing date of U.S. provisional patent application No. 60/311,608.

FIELD OF THE INVENTION

This invention relates generally to the field of property development and more specifically to creating a habitable structure based upon a fanciful structure that was depicted in a motion picture or television show.

BACKGROUND OF THE INVENTION

Urban developments including districts for living units, travel accommodations and business establishments have existed for centuries, and they are still being developed today. Examples of such urban developments include the historic city of Williamsburg, Va., and the modern development of Celebration, Fla. Such urban developments are driven by the everyday needs of the residents and visitors for housing and commerce. Further examples of the urban concept are found in Clarence Perry's monograph on the neighborhood unit from Volume VII of "The Regional Survey of New York and its Environs" published in 1929.

The district is an urbanized area that is functionally specialized. Although districts preclude the full range of activities of urbanism, they are not the single-activity zones of suburbia. Rather, multiple activities support its primary identity. Typically, complex examples are theater districts, capital areas, shopping district and college campuses but not so far as to extend to theme parks or amusement parks that are considered as single-activity zones. Some further examples are Church Street Station in Orlando, Fla., and Riverwalk in San Antonio, Tex.

Large entertainment and resort complexes have been developed within the last several decades. These developments include accommodations, entertainment and shopping facilities for a transient visitor. The Walt Disney World resort complex in central Florida is typical of such complexes. Within these parks are some rides and attractions based upon motion pictures and television shows, or more generally on "Hollywood" themes. A community may develop around a tourist trade to include both entertainment and urban development facilities. Las Vegas, Nev., includes its "Strip" as an integral part of a modern city. The Hilton Hotel in Las Vegas has an attached "Star Trek Experience" attraction that is based generally upon the television show of the same name.

Lodgings are establishments with the capacity to receive people that occupy another's house, apartment, studio, suite, villa, hotel, motel, bed and breakfast establishment, or related business while paying for the accommodations. Within the past several decades, some lodging establishments have incorporated a generic theme common throughout the hotel or resort. Examples include Luxor Hotel and Resort Casino in Las Vegas, Nev., incorporating an Egyptian theme; Polynesian Resort Hotel at the Walt Disney World resort in Orlando, Fla., incorporating a Pacific Island theme; and the Portofino Hotel at Universal Studios in Orlando, Fla., incorporating an Italian Riviera theme. The MGM Grand Hotel and Casino in Las Vegas, Nev. incorporates a Hollywood theme. The casino and guestrooms are inspired by elements from the motion picture "The Wizard of Oz" and other Hollywood-type themes are incorporated throughout various areas of the hotel and resort.

The motion picture and television markets have created a need for studio filming locations that represent real-world locations. Film production companies create environments within which actors may portray characters, and they capture such images on film. Only the areas necessary to simulate a real environment are constructed; therefore, exterior facades seldom include more than three finished walls. Studio backlots include facade structures intended to represent cities, towns, and neighborhoods in a theatrical style. Studio backlot exterior facades are generally separate from interior set designs. Interior sets are often constructed within sound stages located at the studios. Due to filming constraints, interior sets are frequently built in a form that is incompatible with what an exterior facade can accommodate. As a result, there are often inconsistencies between an exterior facade and the related interior set design, although such inconsistencies may go unnoticed by the viewing audience. By example are Universal Studios, Hollywood, Calif.; Disney/MGM Studios, Orlando, Fla.; and Warner Bros. Studios, Burbank, Calif. The homes, apartments, stores, restaurants, places of business, etc. portrayed by these studios in motion pictures and television shows are fanciful structures that appear real when viewed through the lens of a camera. Many have become familiar and memorable to the audiences of the films and television shows. However, the camera creates such fanciful structures and they exist as a functional whole only in the minds of the viewers of the film or television show.

A book titled "TV Sets: Fantasy Blueprints of Classic TV Homes" by Mark Bennett presents idealized drawings of homes that have been depicted in famous television shows. Mr. Bennett describes these drawings as "imaginary blueprints" because they were developed from sketches drawn by the author from memory after viewing the subject television shows. This book does not provide an accurate rendition of the homes due to the limitations of the process used by the author to acquire his information. For example, none of the drawings in this book contain dimensions, nor do they appear to have a consistent scale, as evidenced by the garage in the "Darrin & Samantha Stevens House" from "Bewitched" which has a depth sufficient to accommodate automobiles only slightly longer than the couch in the living room.

The cost to produce a motion picture or television show is great. The commercial exploitation of this investment goes far beyond merely selling tickets at a movie theater or advertising time during a television broadcast. The entertainment industry is known to expand a movie or television brand into a variety of products and services; including, for example, collectibles, clothing, toys, and food. Universal City Studios, Inc. owns United States service mark registration number 1643171 for the mark "RIDE THE MOVIES" for the exploitation of their movie products in the field of amusement park services. Further ways to commercially exploit the investment in a motion picture or television show are needed.

DESCRIPTION OF THE DRAWINGS

The features and advantages of the present invention will become apparent from the following detailed description of the invention when read with the accompanying drawings wherein.

DETAILED DESCRIPTION OF THE INVENTION

The present inventors have discovered that the field of property development will benefit from the use of actual structures and communities that are constructed in accordance with the theatrical structures portrayed in a motion picture or television production. The present invention recognizes the high level of market recognition developed by motion pictures and television for the fanciful homes and businesses depicted in such media, and it exploits this marketing opportunity in the form of products and services in the field of property development. Examples that are described more fully below include the development of individual homes, timeshare communities, and complete urban areas that recreate the fantasy created by the many remarkable settings, architectural facades and homes from the best-loved motion pictures and television series of the past. A further embodiment includes the development of lodging facilities based upon structures portrayed in motion picture and television locations, either as a separate enterprise or in combination with an existing theme park complex.

Figure 1:
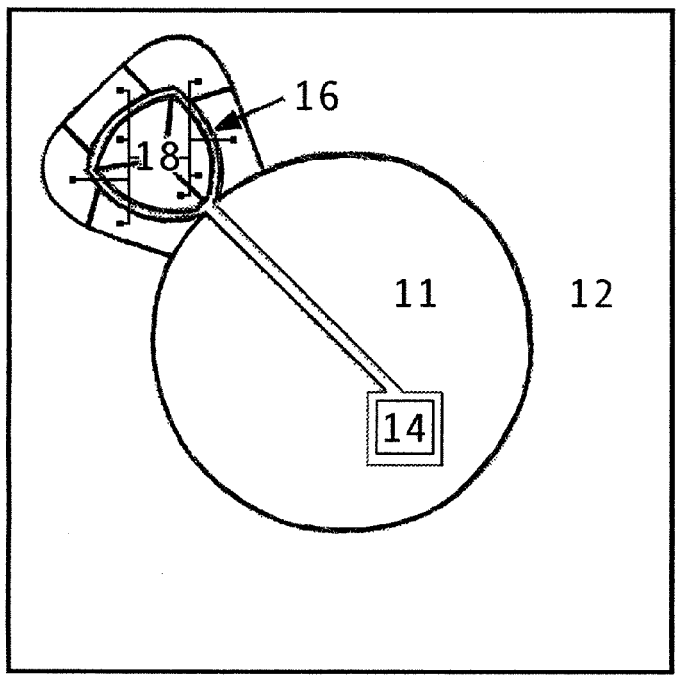
FIG. 1 is a plan view depicting a community master plan.

FIG. 1 depicts a master plan for the development of a community 10 showing the property divided into areas such as a Downtown (Shopping) Area 11 and a Residential Area 12. Structures in one or both of the areas 11, 12 are constructed as integral, habitable renditions of structures portrayed in one or more motion pictures or television shows. The Downtown Area 11 contains parcels for structures housing commercial establishments on a street level, with some such structures also having residential or lodging accommodations on levels above the street level. The overall character of the Downtown city streets may be based on motion pictures and television shows. It is then possible to select a fanciful structure that has been portrayed in a motion picture or a television show to comply with the community master plan; and to design a habitable structure based upon that fanciful structure for a predetermined parcel identified on the master plan. One such a structure is based upon the television show "Happy Days" is "Arnold's Drive-In" diner. The exterior diner facade used in the television show is from an actual building location, while the interior dining room used in the show is a stage setting. Accordingly, the exterior and the interior used in the television show are not completely compatible. The present invention may include within the community 10 an actual eating establishment called "Arnold's Drive-in" 14 constructed as a practical habitable structure wherein the facade, reminiscent of that seen on "Happy Days", is geographically related to the interior dining room, also similar to that seen on "Happy Days". The structure would further include an industrial kitchen as required to prepare food for the restaurant so that the entire establishment becomes a practical facility. Similar philosophies are used for other business establishments and living units throughout the community 10. The term habitable is used herein to describe a structure that is fully functional for its intended use as a dwelling or as a place of business for human beings.

The Residential Area 12 is a collection of houses and/or other accommodations on streets 16 that are short, curved, or otherwise terminated, thereby creating isolated environments 18 within the overall community. These isolated environments may contain structures developed from a common movie or television theme. From within the isolated environment 18, the view is visually limited by the curve of the street 16 or any other visual obstruction to structures having this common theme, so that a resident or visitor may feel completely submersed in a world of motion pictures and television. It is possible to market such an experience to a prospective resident or guest as an opportunity to actually live or vacation inside their favorite movie or television residence.

The overall composition of community 10 may be, for example, that of a small town community in America of previous decades. Each distinctive neighborhood depicts many of the time-honored traditions of yesteryear by surrounding residents and guest with elements from the endearing lifestyles portrayed in a variety of the classic movies and television shows. The engaging atmosphere typifies the "American Dream" once commonly portrayed in film and television and plays to American's longing for the simple life again. The consumer's love of motion pictures and television is realized and fulfilled by this complete and fascinating development 10.

Figure 2:
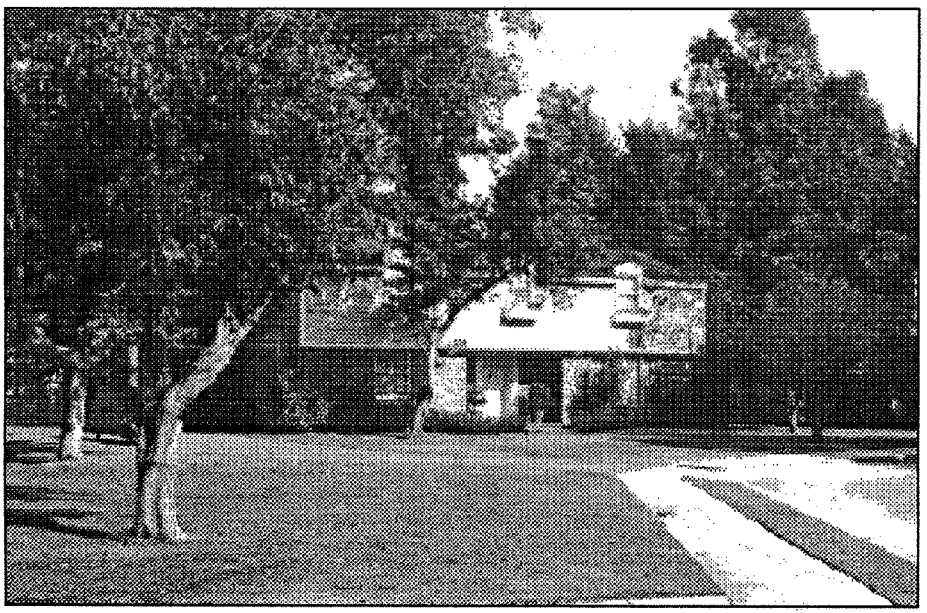
FIG. 2 is a photograph of the actual prior art facade on a motion picture studio backlot that was used as the "Cleaver" house for television show "Leave It To Beaver".
Figure 3:
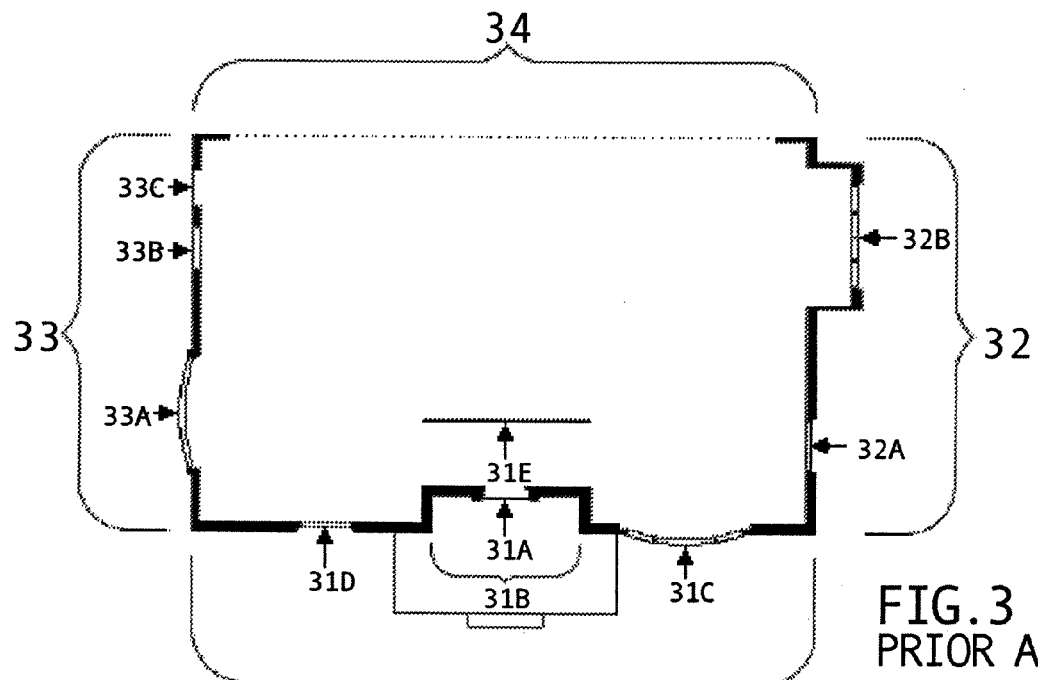
FIG. 3 is a plan view of the prior art motion picture backlot facade that was used as the "Cleaver" house.
Figure 4:
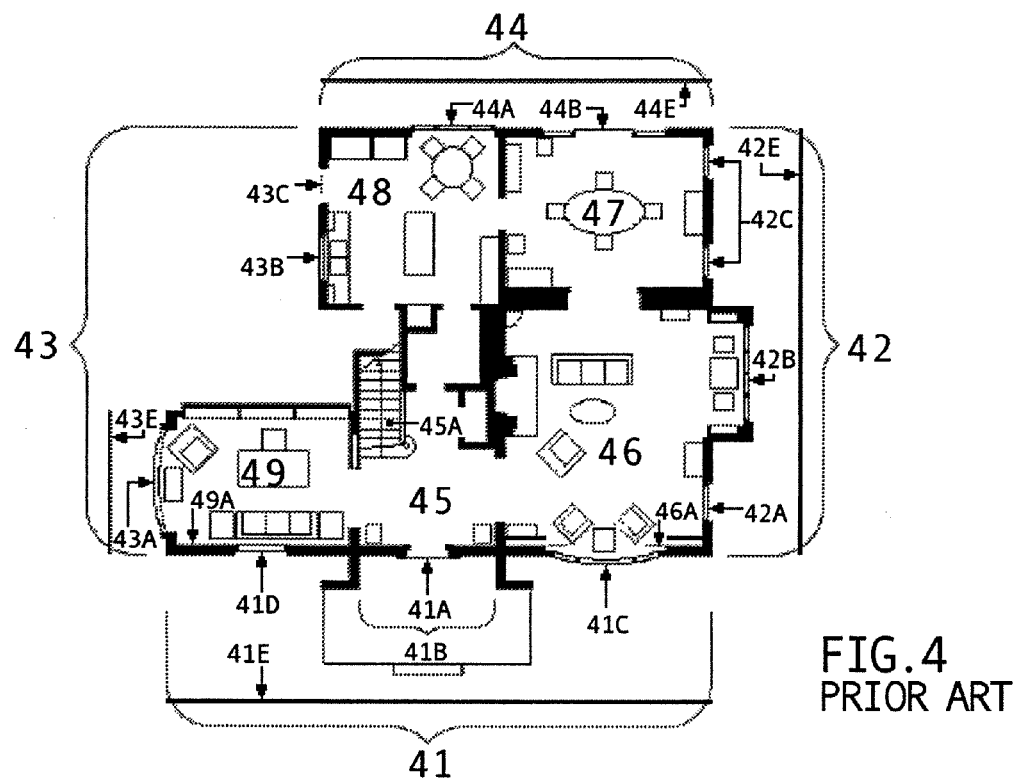
FIG. 4 is a plan view of the ground floor of the prior art motion picture studio stage set that was used for the "Cleaver" house.

The houses and/or other accommodations of community 10 are inspired by popular motion picture and television homes. Each unit is a habitable representation of a dwelling depicted in a particular motion picture or television show complete with all the amenities. Additionally, re-creations of furniture, props, and other household furnishings relative to the particular theme of a house are also included. An example for illustration of the present invention is the "Cleaver" house from the television show "Leave It To Beaver", 1959. The present invention combines the exterior plan of a backlot facade used for that show together with an interior design of the stage setting used for the show, including both a ground floor and a second floor, to create an integrated, habitable living unit. FIG. 2 is a photograph of the backlot facade structure used for exterior filming of the "Cleaver" house. FIG. 3 is a plan view of that facade. The actual dimensions of the facade may be provided on the plan view of FIG. 3 by referring to the original construction drawings for the façade or by taking measurements from the actual structure if it is still available. The facade includes a front wall 31, a right-side wall 32, a left-side wall 33, and a back without a finished wall 34. The front door 31A is set into a recessed area 31B, along the front wall 31. The front wall 31 has a living room bow window 31C, and a study window 31D. Behind the front door 31A, a scenic backing 31E is painted to look like the interior stage setting entry hall 45 of FIG. 4. The right-side wall 32 has a living room window 32A, and a bay window 32B. The left-side wall 33 has a study bow window 33A, a kitchen window 33B, and a kitchen door 33C. FIG. 4 is a plan view of the ground floor stage setting used for the "Cleaver" house. Such a drawing containing dimensions may be obtained by referring to the original construction drawings for the stage set, since in many cases the actual set is destroyed upon the completion of filming. FIG. 4 includes a front wall 41, a right-side wall 42, a left-side wall 43, and a back wall 44. The interior is divided into several rooms representing a residential home including a front hall 45, living room 46, dining room 47, kitchen 48, and study 49. The living room 46 has a bow window 41C, living room window 42A, and bay window 42B that correspond with windows 31C, 32A and 32B respectively, on FIG. 3.

The interior stage setting of FIG. 4 includes several design elements that are inconsistent with the exterior facade of FIG. 3. The dining room 47 has two windows 42C and a French door 44B that do not exist on FIG. 3. Similarly, the kitchen 48 has a window 44A that does not exist on FIG. 3. The kitchen 48 does have a door 43C and a window 43B that correspond with the door 33C and window 33B on FIG. 3. The study 49 has a bow window 43A and a study window 41D that correspond with the bow window 33A and study window 31D on FIG. 3. Backdrops 41E, 42E, 43E, and 44E are visible through all windows on FIG. 4. The backstage area 43J is accessible from the kitchen 48.

Figure 5:
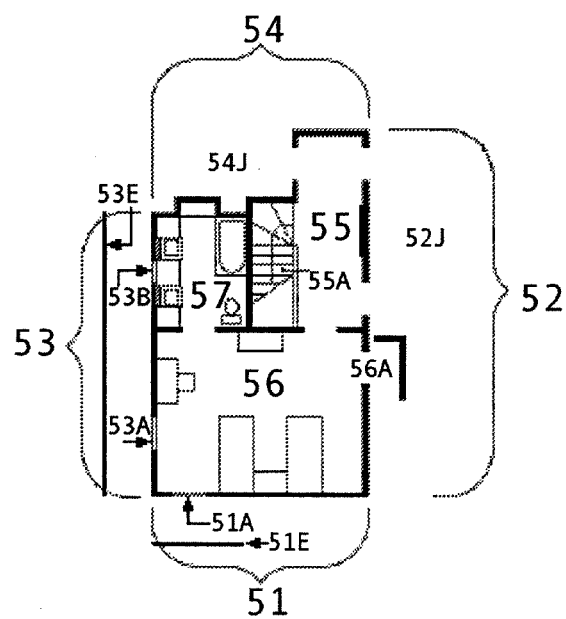
FIG. 5 is a plan view of the second floor of the prior art motion picture studio stage set that was used as the "Cleaver" house.

FIG. 5 is a plan view of the second floor stage setting of the "Cleaver" house. Here, again, such a drawing having dimensions may be obtained by referring to the original construction drawings for the set. FIG. 5 includes a stair hallway 55, boy's bedroom 56, closet 56A, and adjoining bathroom 57. The boy's bedroom 56 has two windows 51A and 53A through which backdrops 51E and 53E can be viewed. The bathroom has a single window 53B, through which a backdrop 53E can be viewed. The backstage areas 52J and 54J are accessible from both the stair hallway 55 and boy's bedroom closet 56A.

While there may be inconsistencies between the dimensions and structural details of a backlot facade used for exterior filming and the corresponding stage set used for interior filming, the dimensions and detail available from drawings such as FIGS. 3-5 are far superior to the information that may be accumulated by simply watching the end-result motion picture or television show, as was done by Mark Bennett for "TV Sets Fantasy Blueprints of Classic TV Homes." For example, note that the basic shape of the actual backlot structure shown in FIG. 3 is very rectangular, while the "fantasy blueprint" presented by Mr. Bennett for this house illustrates an almost square shape. Further note that the window plan of the house depicted by Mr. Bennett is significantly different than the actual structures used for filming. Accordingly, to design a structure that accurately recreates the fantasy of a structure depicted in a motion picture or television show, the present inventors begin by obtaining dimensions for the architectural details of the structure from the exterior facade and interior set used during the actual filming, either from the façade/set itself or from construction drawings used to build the façade/set.

Figure 6:
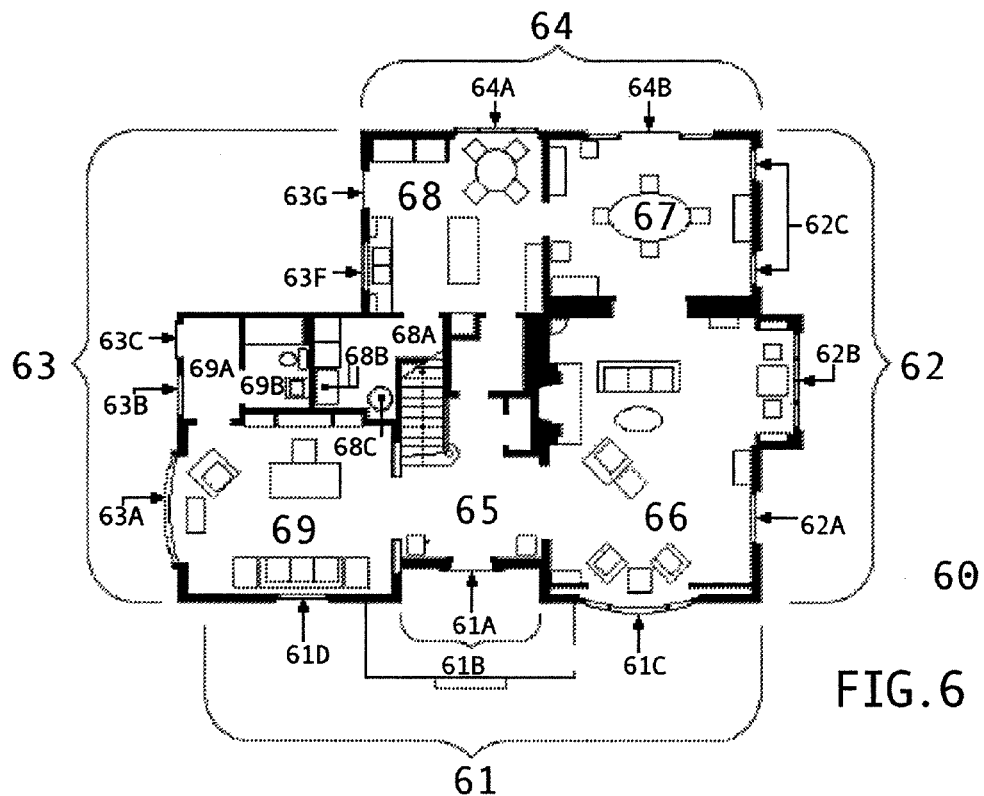
FIG. 6 is a plan view of the ground floor of a living unit based on the "Cleaver" house.
Figure 7:
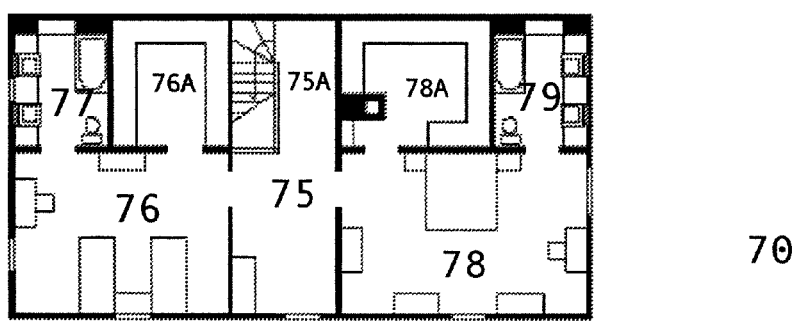
FIG. 7 is a plan view of the second floor of the living unit of FIG. 6 based on the "Cleaver" house.

Once such dimensions are obtained, an actual habitable living residence may be designed and built to include the architectural elements of the "Cleaver" house that are shown in FIGS. 2-5. FIG. 6 is a plan view of the ground floor of such an actual residence 60. The "Cleaver" residence 60 includes a front wall 61, a right-side wall 62, a left-side wall 63, and a back wall 64. The interior is divided into several rooms creating a practical residential home including; a front hall 65, living room 66, dining room 67, kitchen 68, and study 69. FIG. 7 illustrates the second floor 70 of the "Cleaver" residence 60 of FIG. 6. The rooms include a stair hallway 75, boy's bedroom 76, closet 76A, and adjoining bathroom 77. Additionally there is a master bedroom 78, a closet 78A, and a bathroom 79.

For the present invention, the "Cleaver" residence 60 is constructed in such a manner that the exterior of the backlot facade and the design of the interior set are integrated to form a habitable unit. Modifications of architectural elements shown in one or both of the exterior facade or interior stage set may be necessary in order to accomplish this integration. Such modifications are necessary to develop the fanciful television house, which exists only in the minds of the show viewers as seen through disconnected exterior and interior scenes, into an actual habitable unit. The habitable structure is designed and built to include a plurality of architectural elements that collectively cause the habitable structure to resemble a fanciful structure portrayed in one of a motion picture and a television show. Among the considerations, FIG. 3 and FIG. 6 have similar front walls 31 and 61 respectively, however, FIG. 6 modifies both the right-side wall 62 and left-side wall 63 from walls 32 and 33 respectively, as shown on FIG. 3, to work more practically with the interior arrangement. FIG. 4 theatrically takes into account the recessed area at the front door 41B, which is a characteristic feature of FIG. 2 (photograph) and the recessed area 31B of FIG. 3. FIG. 4 presents an interior living room wall 46A, and an interior study wall 49A, that is in line with the interior/exterior wall of the front door 41A. FIG. 6 reflects an adjustment to the front wall line 61 to create a more practical living space that also relates to the characteristic design of FIGS. 2 and 3. Furthermore, a bathroom 69B has been added that is accessible from the study 69 by a hall 69A. Additionally, a functional laundry room 68A also contains an air conditioning and heating unit 68B, and a water heater 68C, and is accessible from the kitchen 68. FIG. 7 has also been modified from FIG. 5. Originally, the staircase 55A of FIG. 5 descended into a pit on the stage floor. The stairway 75A of the actual residence of FIG. 7 contains a sufficient number of risers and treads to reach from the front hall 65 (FIG. 6) to the second floor stair hallway 75 (FIG. 7), thereby allowing for required head clearance. The boy's bedroom 76 door and closet door 76A are reversed in FIG. 7 from what is shown on FIG. 5. Taken together, the features of the "Cleaver" house 60 will recreate the fantasy of the television show structure in the form of a habitable structure.

Figure 8:
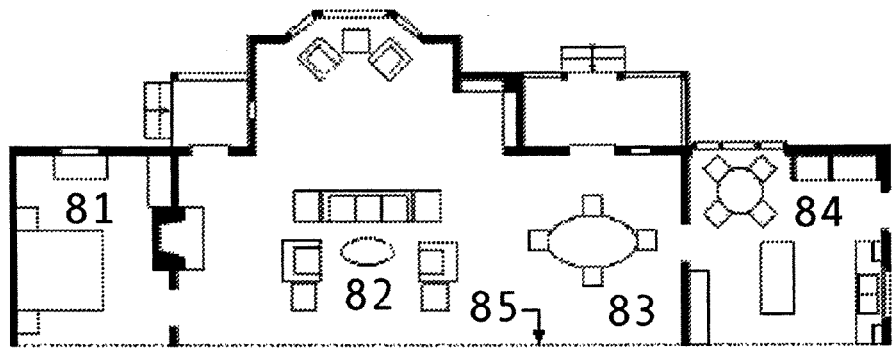
FIG. 8 is a plan view of the ground floor of a prior art stage setting with a missing "fourth wall".

FIG. 8 is a plan view of a prior art stage setting with a missing "fourth wall" 85. The fourth wall 85 is left open to provide viewing access for the camera. Film cameras from only a few years ago were monstrously large machines that could not be easily manipulated within the constraints of most normally sized rooms. As a result, the practice developed to leave one wall of a stage set open for access by the camera. Because the camera is looking away from the missing wall, the viewer has no sense of the missing fourth wall. In the plan of FIG. 8, a bedroom 81, living area 82, dining area 83, and kitchen 84 complete the stage setting.

Figure 9:
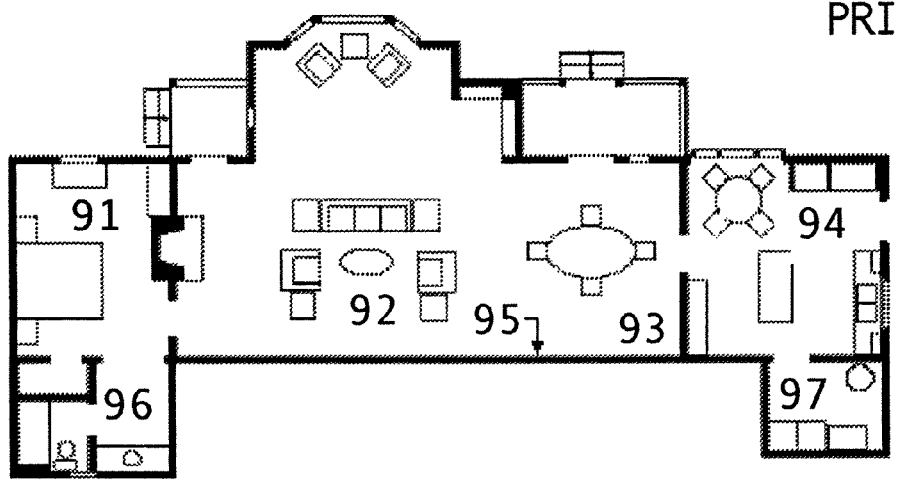
FIG. 9 is a plan view of the ground floor of a living unit based on the stage setting of FIG. 8 with a mirrored wall.

FIG. 9 presents a workable solution to the missing fourth wall 85 when building a habitable structure that recreates a room depicted in a motion picture or a television show. This is accomplished through the addition of an actual fourth wall covered with a full-length mirror 95. Occupants of the residence now become the audience watching themselves, albeit in a mirror image. The placement of furniture or other design elements may be selected to make the mirror image more closely representative of the image seen in the movie or television show. As in FIG. 8, the bedroom 91, living area 92, dining area 93, and kitchen 94 are maintained, but other practical requirements such as a bathroom 96 and laundry room 97 are added as well.

Figure 10:
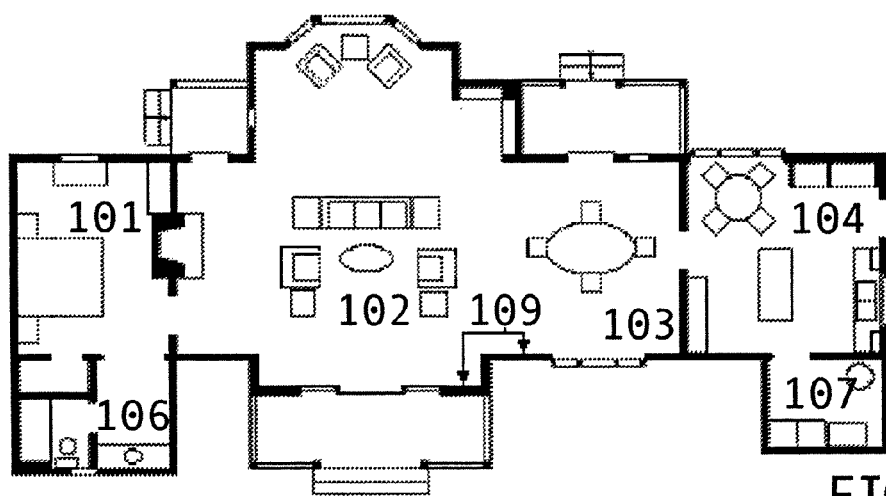
FIG. 10 is a plan view of an alternative arrangement of the ground floor of a living unit based on the stage setting of FIG. 8.

The missing fourth wall 85 of a stage set may provide additional flexibility for the interior design, but it may further be constrained by the exterior design requirements if the fourth wall 85 represents an outside wall that is viewed from the exterior by the audience of a performance. FIG. 10 presents yet another workable solution to the missing fourth wall 85 through implementation of a fourth wall or series of walls 109 designed "in the spirit of" the production as portrayed in a motion picture or television show. As in FIGS. 8 and 9, the bedroom 101, living area 102, dining area 103, and kitchen 104 are maintained but other practical requirements such as a bathroom 106, and laundry room 107 are added along with a complimentary fourth wall 109. In this example, the design elements of the actual fourth wall 109 also impact the exterior appearance.

Figure 11:
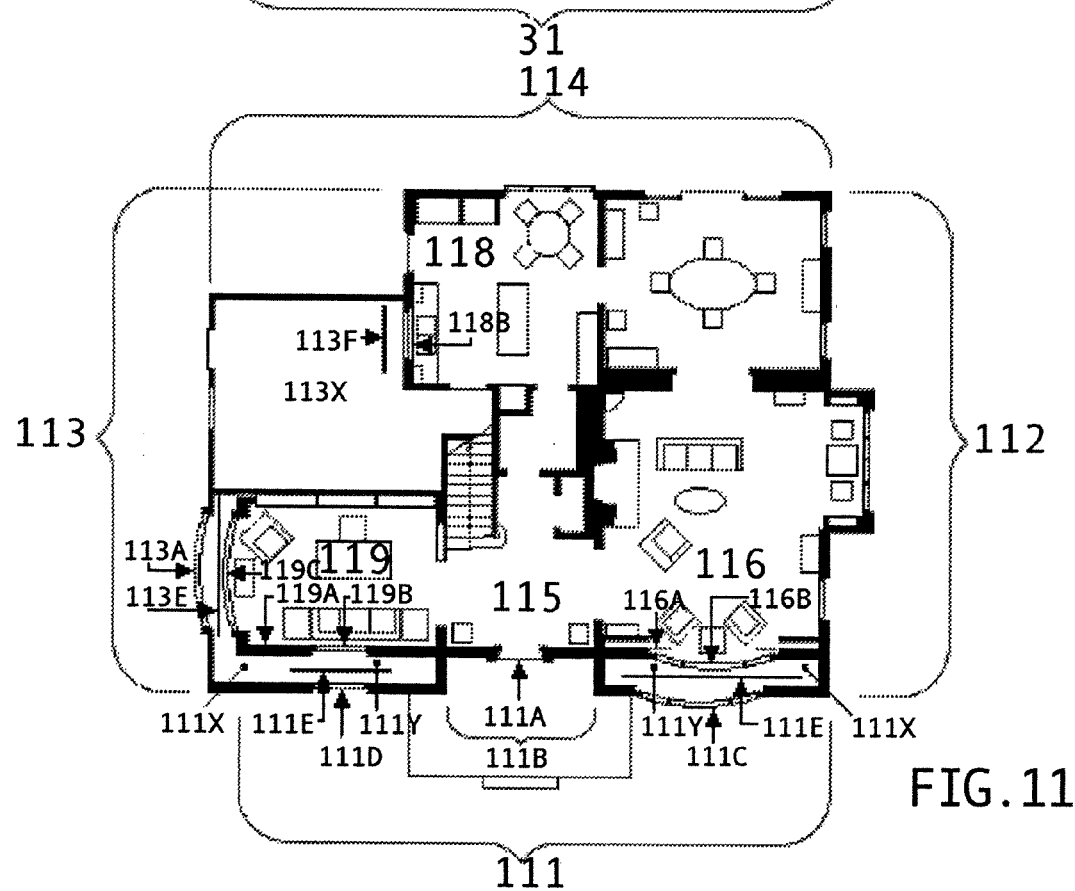
FIG. 11 is a plan view of the ground floor of a living unit based on the "Cleaver" house utilizing an architectural facade or "outer skin" along with an independent interior design.

Another embodiment of the present invention allows for maintaining the exterior facade FIG. 3 and interior wall FIG. 4 as they originally appeared in the movie or television production in spite of inconsistencies there between by creating a structure with an architectural facade or "outer skin" that is independent of the interior design. FIG. 11 is a plan view of an actual structure of this type of design using the "Cleaver" house as its design inspiration. FIG. 11 has a front wall 111 and left-side wall 113 that matches the backlot facade as in FIG. 3. The front door 111A is aligned to match the front door 31A in FIG. 3 and therefore remains as a practical entrance. FIG. 11 utilizes a separate interior wall configuration 116A and 119A in addition to the exterior facade wall 111. The interior walls 116A and 119A are located in the living room 116 and study 119 respectively, and they match the corresponding rooms of the stage setting of FIG. 4. As a result, a void space 111X is created between the exterior windows 111C and 111D, and the interior windows 116B and 119B. Double-sided painted backdrops 111E and 113E may be located within this void space 111X. Alternatively, any type of architectural element such as light source 111Y may be located in this area, with or without the backdrops 111E and 113E. One side of the backdrops, 111E and 113E, facing exterior windows 111C, 111D, and 113A is dressed to resemble curtains while the backdrops 111E, 113E, and 113F facing the interior rooms 116, 119 and 118 is painted to resemble landscapes. Large void spaces such as 113X may be configured to include other practical requirements such as additional bathrooms or a laundry room that is not part of the original set design of FIG. 4. Some walls such as the right-side wall 112 and back wall 114 are made of standard construction, with windows to view the natural landscape, or with structures erected to create an artificial back and/or side yard complete with painted backdrops and/or artificial landscape.

Any interior stage setting that does not match its respective exterior set design will necessitate a redesign to make a complete habitable structure practical for its intended use. For some structures, it is most important to maintain the integrity of the interior space because of its familiarity to the public. In other circumstances, the exterior will be used to set the design limits. In still other situations, a combination of interior and exterior architectural elements may be critical to recreating the fantasy presented in a movie or television show. While each structure will be designed on an individual basis, some design rules may be established for integrating a facade with an interior set design to arrive at a habitable structural design that accurately recalls the structure as depicted in the visual media. For example, in order to maintain the spirit of the fanciful structure being recreated, the size of some of the elements of the habitable structure may require some stretching or shrinking in size when compared to their inspirational backlot facade or interior stage set. Stretching or shrinking of dimensions may be necessitated to provide proper alignment between features of the respective inspirational exterior and interior, to provide room for necessary design features that were missing from the inspirational structures, and/or to compensate for the optical effect that makes things look larger than real life when shown on a screen or television set. A design rule may be used that an actual room built to depict an interior set shown in a film should be constructed with dimensions that are a predetermined percentage larger than or smaller than the set, for example 5%, 10% or 15% larger, in order to create an impression on a person entering the actual room that is consistent with their memory of the set as viewed in the film. Structures may also require additional rooms and spaces that were never seen or designed for the production. A design rule may require that rooms such as kitchens, bathrooms, and service areas that are not included in the production may be located in areas within the building facade that are not depicted in the media production, and that the dimensions of the depicted rooms may be adjusted to only a predetermined degree to provide space for the needed additional rooms. In a further example, the relative position of rooms within a structure may be preserved by rule in order to preserve the integrity of the presentation, since the general layout of rooms is a feature that is often recalled after viewing a film or television show. Thus a set of design rules may be established when integrating an exterior facade with an interior set design to resolve conflicts created by mismatched architectural elements from the respective exterior and interior to arrive at the design of an actual habitable structure. Such conflicts may arise not only between mismatched interior and exterior elements, but also between two or more mismatched interior elements or between two or more mismatched exterior elements.

Accordingly, a method used to design a habitable real-world structure that is based upon a fanciful structure that has been depicted in a motion picture or a television show will include the step of identifying one or more architectural elements that are important to the recreation of the fantasy of the motion picture or television show. The term architectural element is used herein to include structural elements as well as live or artificial landscaping, furniture, props, lighting fixtures and furnishings that are depicted as part of, or together with, the fanciful structure. If more than one such element is identified, a further step may be taken to prioritize the relative importance of these elements in order to resolve conflicts between alternative design choices affecting any architectural element. The priorities are assigned to give the highest weight to architectural elements that play the most important role in recreating the fantasy presented by the movie or television show. These are generally the elements from the movie or television show that people remember the most or that they most closely identify with. The priorities may be assigned on the basis of a designer's innate opinion of what a viewer will consider important or memorable, or upon empirical data developed specifically to test for such priorities. For example, a focus group of people familiar with a particular movie or television show may be polled to identify the key elements of the fantasy that they experienced. Design rules are developed consistent with these priorities to ensure that the most important architectural elements are maintained when resolving any inconsistency between an interior design and an exterior facade or when adding any design element. The dimensions of the important architectural elements are determined as described above with respect to FIGS. 3-5 by referring to either an existing structure that was used for the filming or by referring to drawings that were used for the construction of such a structure. Only if such methods are unavailable should such dimensions be estimated by scaling or other means.

The relative importance or priority of conflicting architectural elements may be determined in other ways that serve to identify the elements that would likely be the most prominent in the minds of the viewing public. For example, priority may be based upon: the number of appearances of the respective elements in scenes of the motion picture or television show; or for a television show having multiple episodes, based upon the number of episodes in which the respective elements appeared; or the relative total on-screen time of the elements; or the number of times that the elements are mentioned in the script dialogue; or the relative prominence of the elements to a plot line.

The present invention has application to a variety of commercial endeavors. In one embodiment, a structure from a movie or television show is recreated as a stand-alone habitable building for use as a store, theater, restaurant, business establishment, apartment, lodging, time-share residence, bed-and-breakfast, private home or any other use allowed under local land development ordinances. In another embodiment, a plurality of such buildings are designed and built as part of an overall community development plan, such as the community 10 of FIG. 1.

Figure 12:
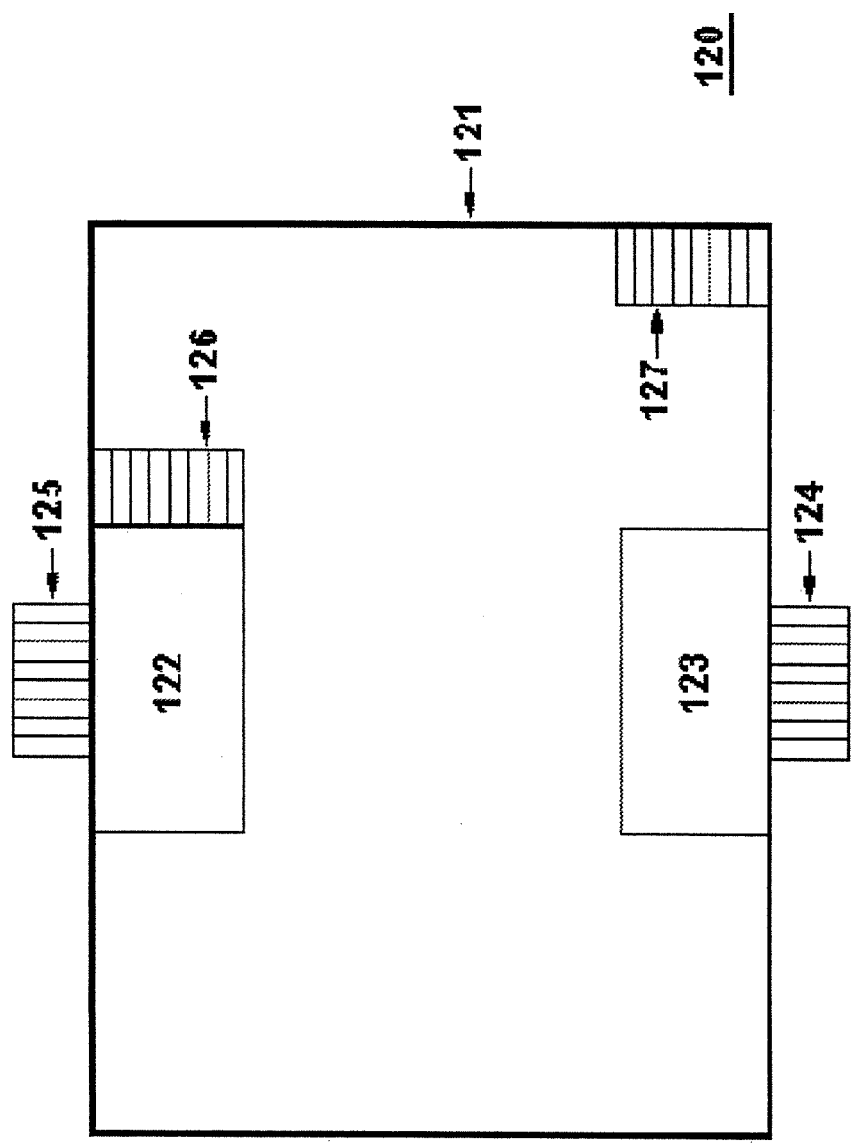
FIG. 12 is a plan view of an integrated property development including an entertainment complex and associated structures designed to depict fanciful structures from a movie or television show.

A habitable structure may be designed and built to recreate a structure depicted in a movie or television show as part of a larger entertainment complex. A typical entertainment complex may include one or more attraction areas such as an amusement park, theme park, ride, show, shopping establishment, theater, nightclub, eating establishment, accommodation, etc. For example, FIG. 12 illustrates an integrated property development 120 including an entertainment complex 121 having one or more major attraction areas 122, 123. A fanciful structure depicted in a motion picture or television show may be selected because it is related to a theme of the entertainment complex 121. A habitable structure may then be designed and constructed based upon that fanciful structure for a commercial use associated with the entertainment complex. For example, located proximate the entertainment complex 121 and associated directly with major attraction area 123 is a first habitable structure 124 designed to recreate the fantasy of a structure depicted in a motion picture or television show. The habitable structure 124 includes a plurality of architectural elements that collectively cause the habitable structure to resemble a fanciful structure portrayed in one of a motion picture and a television show, as described above. In this case, structure 124 may be a plurality of timeshare residences that can be leased to persons who frequent the entertainment complex 121. The fantasy being recreated in structure 124 may be selected to complement the theme of the contiguous major attraction area 123. Users of the time-share dwellings 124 may be provided with more convenient access to the major attraction 123 and the entertainment complex 121 than would be provided to the general public. Additional such habitable structures 125, 126 are located contiguous to major attraction 122 and may be constructed to depict other fanciful structures from one or more movies or television shows. Structure 125 is located to be directly accessible from outside the entertainment complex 121 while structure 126 is accessible from only within the entertainment complex 121. Structures 125, 126 may be used as lodging, eateries, stores, or for other functions associated with the entertainment complex 121. Another such habitable structure 127 is built to recreate a fanciful structure depicted in a movie or television show and is located within the development 121 separate from any of the major attractions 122, 123. Structure 127 may have sections accessible from within the entertainment complex 121 and may have other sections accessible from outside the entertainment complex 121. Structure 127 may be a hotel including rooms that are designed and constructed to recreate fanciful rooms from one or more movies or television shows in accordance with the method described above. An existing entertainment complex 121 may be improved by the addition of one or more such habitable structures 124, 125, 126, 127 that recreate a fanciful structure depicted in a movie or television show.

An existing theme park such as the Disney-MGM Studios park in Orlando, Fla., may be improved by upgrading a backlot structure, currently used only for filming and not habitable, to become a habitable structure that recreates the fantasy of the structure as displayed in the filmed motion picture or television show. The backlot tour provided to visitors at the Disney-MGM Studios takes visitors past exterior facades that are used for the filming of various Disney shows, such as the Golden Girls, for example. The facades have a missing fourth wall or a wall that is incomplete, unfinished or easily removed. The existing facade may be converted into a habitable structure by incorporating interior architectural elements designed in accordance with the dimensions of the studio set(s) used for such interior scenes. It is possible that a conflict may arise between the actual exterior façade and an interior architectural element of the interior stage set. Such conflict may be resolved by including in the habitable structure an interior wall spaced apart from the corresponding exterior wall of the façade, as described above with respect to FIG. 11, so that both the conflicting interior architectural element and the actual exterior façade can be retained in the habitable structure design. In this manner, the existing facades may be made useable as accommodations for guests visiting the park. In this manner, as existing backlot structural facade may be made more valuable to the studio for exploiting the creative concepts of the motion picture or television show. Because modern cameras have become so small, the converted structure may also be useful as a location for filming the interior scenes rather than using a separate studio set, thereby further enhancing the commercial value generated by the structure.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method of design comprising:
   selecting a fanciful structure portrayed in a motion picture or a television show;
   obtaining dimensions of exterior architectural elements of an exterior façade used to portray the fanciful structure during filming of the motion picture or television show;
   obtaining dimensions of interior architectural elements of an interior stage set used to portray the fanciful structure during filming of the motion picture or television show;
   designing a habitable structure incorporating the exterior and interior architectural elements;
   during the step of designing, identifying a conflict arising between mismatched ones of the architectural elements; and resolving the conflict to enable the design of the habitable structure to represent the fanciful structure;
further comprising resolving the conflict by prioritizing the mismatched architectural elements based upon their respective relative prominence in the motion picture or television show,
further comprising determining the relative prominence of the mismatched architectural elements based upon a number of appearances of the respective elements in the motion picture or television show.

2. The method of claim 1, further comprising obtaining dimensions of exterior architectural elements by measuring the actual exterior façade used during filming of the motion picture or television show or by utilizing a drawing used for construction of the actual exterior façade.

3. The method of claim 1, further comprising obtaining dimensions of interior architectural elements by measuring the actual interior stage set used during filming of the motion picture or television show or by utilizing a drawing used for construction of the actual stage set.

4. The method of claim 1, wherein the step of designing a habitable structure comprises designing the habitable structure to incorporate an actual exterior façade used during filming of the motion picture or television show.

5. A method of design as applied to a fanciful structure portrayed in a television show having multiple episodes, the method comprising:
selecting a fanciful structure portrayed in a motion picture or a television show;
obtaining dimensions of exterior architectural elements of an exterior façade used to portray the fanciful structure during filming of the motion picture or television show;
obtaining dimensions of interior architectural elements of an interior stage set used to portray the fanciful structure during filming of the motion picture or television show;
designing a habitable structure incorporating the exterior and interior architectural elements;
during the step of designing, identifying a conflict arising between mismatched ones of the architectural elements; and
resolving the conflict to enable the design of the habitable structure to represent the fanciful structure;
further comprising resolving the conflict by prioritizing the mismatched architectural elements based upon their respective relative prominence in the motion picture or television show,
further comprising determining the relative prominence of the mismatched architectural elements based upon a number of the episodes in which the respective elements appeared.

6. The method of claim 5, further comprising obtaining dimensions of exterior architectural elements by measuring the actual exterior façade used during filming of the motion picture or television show or by utilizing a drawing used for construction of the actual exterior façade.

7. The method of claim 5, further comprising obtaining dimensions of interior architectural elements by measuring the actual interior stage set used during filming of the motion picture or television show or by utilizing a drawing used for construction of the actual stage set.

8. A method of design comprising:
selecting a fanciful structure portrayed in a motion picture or a television show;
obtaining dimensions of exterior architectural elements of an exterior façade used to portray the fanciful structure during filming of the motion picture or television show;
obtaining dimensions of interior architectural elements of an interior stage set used to portray the fanciful structure during filming of the motion picture or television show;
designing a habitable structure incorporating the exterior and interior architectural elements;
during the step of designing, identifying a conflict arising between mismatched ones of the architectural elements; and
resolving the conflict to enable the design of the habitable structure to represent the fanciful structure;
further comprising resolving the conflict by prioritizing the mismatched architectural elements based upon their respective relative prominence in the motion picture or television show;
further comprising determining the relative prominence of the mismatched architectural elements based upon a total on-screen time of the respective elements in the motion picture or television show.

9. The method of claim 8, further comprising obtaining dimensions of exterior architectural elements by measuring the actual exterior façade used during filming of the motion picture or television show or by utilizing a drawing used for construction of the actual exterior façade.

10. The method of claim 8, further comprising obtaining dimensions of interior architectural elements by measuring the actual interior stage set used during filming of the motion picture or television show or by utilizing a drawing used for construction of the actual stage set.

11. The method of claim 8, wherein the step of designing a habitable structure comprises designing the habitable structure to incorporate an actual exterior façade used during filming of the motion picture or television show.

12. A method of design comprising:
selecting a fanciful structure portrayed in a motion picture or a television show;
obtaining dimensions of exterior architectural elements of an exterior façade used to portray the fanciful structure during filming of the motion picture or television show;
obtaining dimensions of interior architectural elements of an interior stage set used to portray the fanciful structure during filming of the motion picture or television show;
designing a habitable structure incorporating the exterior and interior architectural elements;
during the step of designing, identifying a conflict arising between mismatched ones of the architectural elements; and
resolving the conflict to enable the design of the habitable structure to represent the fanciful structure;
further comprising resolving the conflict by prioritizing the mismatched architectural elements based upon their respective relative prominence in the motion picture or television show;
further comprising determining the relative prominence of the mismatched architectural elements based upon a number of times the respective elements are mentioned in the script dialogue of the motion picture or television show.

13. The method of claim 12, further comprising obtaining dimensions of exterior architectural elements by measuring the actual exterior façade used during filming of the motion picture or television show or by utilizing a drawing used for construction of the actual exterior façade.

14. The method of claim 12, further comprising obtaining dimensions of interior architectural elements by measuring the actual interior stage set used during filming of the motion picture or television show or by utilizing a drawing used for construction of the actual stage set.

15. A method of design comprising:
  selecting a fanciful structure portrayed in a motion picture or a television show;
  obtaining dimensions of exterior architectural elements of an exterior façade used to portray the fanciful structure during filming of the motion picture or television show;
  obtaining dimensions of interior architectural elements of an interior stage set used to portray the fanciful structure during filming of the motion picture or television show;
  designing a habitable structure incorporating the exterior and interior architectural elements;
  during the step of designing, identifying a conflict arising between mismatched ones of the architectural elements; and
  resolving the conflict to enable the design of the habitable structure to represent the fanciful structure;
  further comprising resolving the conflict by prioritizing the mismatched architectural elements based upon their respective relative prominence in the motion picture or television show;
  further comprising determining the relative prominence of the mismatched architectural elements based upon relative importance to a plot line of the motion picture or television show.

16. The method of claim 15, further comprising resolving the conflict by designing the habitable structure to comprise an interior wall and an architectural facade spaced apart from the interior wall in response to a mismatch between an interior architectural element and an exterior architectural element.

17. The method of claim 16, further comprising designing the habitable structure to comprise an architectural element in a space defined between the interior wall and the architectural facade.

18. The method of claim 15, further comprising obtaining dimensions of exterior architectural elements by measuring the actual exterior façade used during filming of the motion picture or television show or by utilizing a drawing used for construction of the actual exterior façade.

19. The method of claim 15, further comprising obtaining dimensions of interior architectural elements by measuring the actual interior stage set used during filming of the motion picture or television show or by utilizing a drawing used for construction of the actual stage set.

20. The method of claim 15, wherein the step of designing a habitable structure comprises designing the habitable structure to incorporate an actual exterior façade used during filming of the motion picture or television show.

* * * * *